(12) United States Patent
Tanaka (10) Patent No.: US 8,848,234 B2
(45) Date of Patent: Sep. 30, 2014

(54) PRINTER, PRINTING METHOD, AND PROGRAM

(75) Inventor: Maiko Tanaka, Chiba (JP)

(73) Assignee: Seiko Instruments Inc., Chiba (JP)

(*) Notice: Subject to any disclaimer, the term of this patent is extended or adjusted under 35 U.S.C. 154(b) by 233 days.

(21) Appl. No.: 13/404,523

(22) Filed: Feb. 24, 2012

(65) Prior Publication Data

US 2012/0243929 A1 Sep. 27, 2012

(30) Foreign Application Priority Data

Mar. 23, 2011 (JP) .................. 2011-064285

(51) Int. Cl.
*G06K 15/00* (2006.01)
*G06K 1/00* (2006.01)
*G06F 3/12* (2006.01)
*H04N 1/387* (2006.01)
*G06K 15/02* (2006.01)

(52) U.S. Cl.
CPC .................... *G06K 15/189* (2013.01)
USPC ......... 358/1.18; 358/1.5; 358/1.15; 358/1.16; 358/452; 358/453

(58) Field of Classification Search
CPC .............. H04N 2201/0082; H04N 2201/0087; H04N 2201/3201; H04N 2201/3205; H04N 2201/3221; H04N 2201/3226; H04N 2201/3271; H04N 2201/3276; H04N 2201/3277; G06K 15/189; G06K 15/1893; G06K 15/1894

See application file for complete search history.

(56) References Cited

U.S. PATENT DOCUMENTS

| 2002/0085230 A1 | 7/2002 | Kitahara et al. |
| 2007/0115498 A1* | 5/2007 | Noel et al. .................. 358/1.15 |
| 2008/0266605 A1 | 10/2008 | Nishide |
| 2009/0201538 A1* | 8/2009 | Ishikawa et al. ............. 358/1.15 |
| 2010/0231952 A1 | 9/2010 | Giannetti et al. |
| 2011/0013214 A1* | 1/2011 | Kaida et al. .................. 358/1.13 |

FOREIGN PATENT DOCUMENTS

| EP | 1 408 465 A2 | 4/2004 |
| JP | 2004-133778 A | 4/2004 |

OTHER PUBLICATIONS

Extended European Search Report for European Application No. 12159999.7, dated Dec. 10, 2013, 6 pages.

* cited by examiner

*Primary Examiner* — Fan Zhang
*Assistant Examiner* — Haris Sabah
(74) *Attorney, Agent, or Firm* — Brinks Gilson & Lione (57) ABSTRACT

A printer includes: a receiving unit for receiving image identification information, image position information, and print data from outside as printing command data; an image printing position determining unit for reading image size information from a storage unit based on the image identification information in the printing command data received by the receiving unit and determining a position on a printing surface at which the image is to be printed, based on the image position information received by the receiving unit and the read image size information; a superimposing unit for superimposing image data read from the storage unit on the print data received by the receiving unit at the position determined by the image printing position determining unit; and a printing unit for printing a result of the superimposition by the superimposing unit.

9 Claims, 6 Drawing Sheets

STORAGE UNIT

| IMAGE NUMBER | IMAGE SIZE | | IMAGE DATA (BINARY DATA) |
|---|---|---|---|
| | VERTICAL (HEIGHT) | HORIZONTAL (WIDHT) | |
| 1 | 300 | 300 | Image 1 |
| 2 | 256 | 384 | Image 2 |
| ⋮ | ⋮ | ⋮ | ⋮ |

FIG.4

| COMMAND= IMAGE REGISTRATION | IMAGE NUMBER | IMAGE DATA (BINARY DATA) |
|---|---|---|

FIG.5

| COMMAND= PRINTING | IMAGE NUMBER | IMAGE POSITION | PRINTING DATA |
|---|---|---|---|

«PRINTER, PRINTING METHOD, AND PROGRAM»

RELATED APPLICATIONS

This application claims priority under 35 U.S.C. §119 to Japanese Patent Application No. 2011-064285 filed on Mar. 23, 2011, the entire content of which is hereby incorporated by reference.

BACKGROUND OF THE INVENTION

1. Field of the Invention

The present invention relates to a printer, a printing method, and a program.

2. Description of the Related Art

When a receipt is printed in a point of sales (POS) register or the like, an image such as a watermark may be printed on the receipt. Japanese Patent Application Laid-open No. 2004-133778 describes a technology in which an image is previously registered in a printer, and watermark printing is performed continuously at the time of printing so that the image is superimposed on a printing portion between a predetermined keyword (character string) and another predetermined keyword.

In a printer according to the related art, when characters and an image previously registered in a printer are printed so as to be superimposed on one another, only one kind of image can be printed.

It is also possible that a plurality of images are stored in a host computer and an image is selected appropriately and transferred from the host computer to a printer to be printed. However, with this method, it is necessary that image data having a large data amount be transferred to the printer every time printing is performed, which takes a long period of time for data transfer.

Further, with a method in which a host computer creates raster print data of an entire printing range containing characters and an image and transmits the raster print data to a printer, the data of a blank portion becomes large, which requires an even longer period of time for data transfer.

SUMMARY OF THE INVENTION

The present invention has been made in view of the above-mentioned problems, and therefore, it is an object of the present invention to provide a printer, a printing method therefor, and a computer program with which a plurality of images can be selected, a long period of time is not required for data transfer, and an image can be printed so as to be superimposed on a desired position in a region of characters to be printed.

[1] In order to solve the above-mentioned problems, a printer according to an embodiment of the present invention includes: a storage unit for storing image identification information for identifying an image, image size information, and image data indicating an image content in association with one another; a receiving unit for receiving the image identification information, image position information, and print data from outside as printing command data; an image printing position determining unit for reading the image size information from the storage unit based on the image identification information in the printing command data received by the receiving unit and determining a position on a printing surface at which the image is to be printed, based on the image position information received by the receiving unit and the read image size information; a superimposing unit for superimposing the image data read from the storage unit on the print data received by the receiving unit at the position determined by the image printing position determining unit; and a printing unit for printing a result of the superimposition by the superimposing unit.

[2] In the printer according to the embodiment of the present invention, the receiving unit receives the image identification information and the image data indicating the image content from the outside as image registration command data, and the printer further includes an image registering unit for writing the image identification information and the image data in the image registration command data received by the receiving unit in the storage unit in association with each other.

[3] In the printer according to the embodiment of the present invention, in a case where an image size does not fit within a predetermined size, the image printing position determining unit determines the position on the printing surface at which the image is to be printed after reducing the image size so that the image size fits within the predetermined size.

[4] Further, a printing method according to another embodiment of the present invention, which is used in a printer including a storage unit for storing image identification information for identifying an image, image size information, and image data indicating an image content in association with one another, includes: receiving the image identification information, image position information, and print data from outside as printing command data; reading the image size information from the storage unit based on the image identification information in the printing command data received in the receiving and determining a position on a printing surface at which the image is to be printed, based on the image position information received in the receiving and the read image size information; superimposing the image data read from the storage unit on the print data received in the receiving at the position determined in the determining; and printing a result of the superimposing.

[5] Further, according to still another embodiment of the present invention, a program causes a computer to function as: a storage unit for storing image identification information for identifying an image, image size information, and image data indicating an image content in association with one another; a receiving unit for receiving the image identification information, image position information, and print data from outside as printing command data; an image printing position determining unit for reading the image size information from the storage unit based on the image identification information in the printing command data received by the receiving unit and determining a position on a printing surface at which the image is to be printed, based on the image position information received by the receiving unit and the read image size information; a superimposing unit for superimposing the image data read from the storage unit on the print data received by the receiving unit at the position determined by the image printing position determining unit; and a printing unit for printing a result of the superimposition by the superimposing unit.

According to the present invention, a plurality of kinds of images can be printed so as to be superimposed on a desired position without transmitting image data from a host computer to a printer every time printing is performed. Therefore, it does not require a long period of time for transferring the image data, and printing can be performed in a short period of time.

Further, according to the present invention, an image such as a watermark can be printed at any position on a printing surface.

DETAILED DESCRIPTION OF THE PREFERRED EMBODIMENT

Hereinafter, one embodiment of the present invention is described with reference to the drawings.

Figure 1:
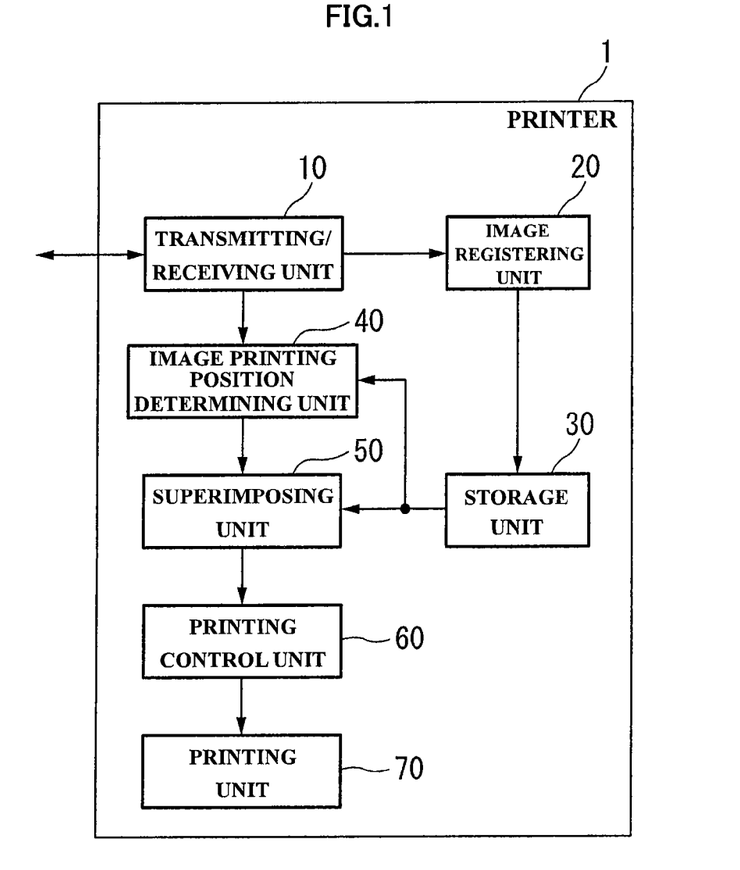
FIG. 1 is a block diagram illustrating a functional configuration of a printer according to an embodiment of the present invention.

FIG. 1 is a block diagram illustrating a functional configuration of a printer according to this embodiment. As illustrated in the figure, a printer 1 includes a transmitting/receiving unit 10 (receiving unit), an image registering unit 20, a storage unit 30, an image printing position determining unit 40, a superimposing unit 50, a printing control unit 60, and a printing unit 70.

The transmitting/receiving unit 10 receives command data from outside (host computer 2). The command data is described later for the specific technical matter thereof, and examples thereof include an image registering command, a printing command, and other such data. Further, the transmitting/receiving unit 10 transmits a ready signal indicating a ready state of the printer 1, an acknowledge signal indicating whether or not the command data has been received normally, and the like.

The image registering unit 20 registers image data (image) in the storage unit 30. Specifically, the image registering unit 20 writes an image number (image identification information) and image data from image registering command data received by the transmitting/receiving unit 10 in the storage unit 30 in association with each other.

The storage unit 30 stores the image number for identifying the image, image size information, and the image data indicating the contents of the image in an associated state.

The image printing position determining unit 40 reads image size information from the storage unit 30 based on the image number in the command data received by the transmitting/receiving unit 10 and determines a position on a printing surface at which the image is to be printed, based on the image position information received by the transmitting/receiving unit 10 and the image size information read from the storage unit 30.

The superimposing unit 50 superimposes the image data read from the storage unit 30 on the print data at the position determined by the image printing position determining unit 40.

The printing control unit 60 transmits the data (print data in which characters and an image are superimposed on one another in a predetermined positional relationship) superimposed by the superimposing unit 50 to the printing unit 70 in a predetermined procedure.

The printing unit 70 prints and outputs the data passed from the printing control unit 60 based on the control from the printing control unit 60. The printing unit 70 includes printing means of, for example, a thermal, toner, or inkjet type, and a paper-feed mechanism.

Figure 2:
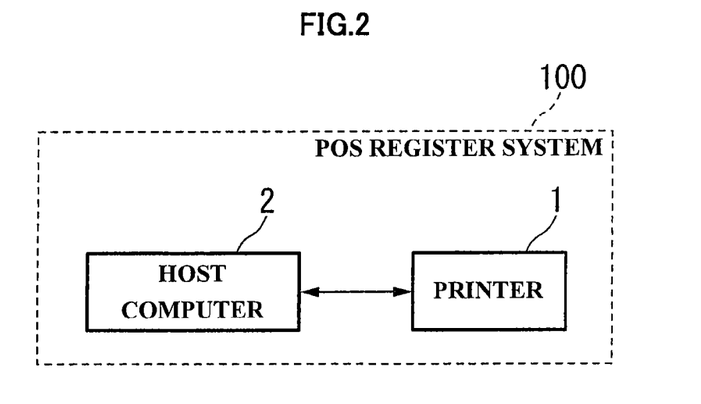
FIG. 2 is a block diagram illustrating a configuration of a POS register system including the printer of the embodiment of the present invention.

FIG. 2 is a block diagram illustrating a configuration of a point of sales (POS) register system including the printer 1. As illustrated in FIG. 2, a POS register system 100 includes the printer 1 and the host computer 2. The printer 1 and the host computer 2 are connected to each other through communication means such as a cable, and are capable of communicating with each other through the use of an electric signal, an optical signal, or the like.

The host computer 2 is a computer of a stored program system, and has a function of a register (cash register). Further, the host computer 2 may have a function of issuing tickets for entertainment, transportation, and the like. Further, the host computer 2 may serve as a receiving agency and have a function of issuing receipts and the like.

The host computer 2 previously transmits image data such as a watermark image to the printer 1 and registers the image data in the printer 1. The host computer 2 transmits data for printing to the printer 1, if required. The host computer 2 transmits instructions of image registration and printing to the printer 1 as command data. The configuration of the command data is described later. The procedure based on the existing technology can be used as a communication procedure, and hence the description thereof is omitted here.

When the printer 1 receives command data for image registration from the host computer 2, the printer writes image data contained in the command in the storage unit 30. Further, when the printer 1 receives command data for printing from the host computer 2, the printer 1 reads the image data previously stored in the storage unit 30 and prints and outputs an image thereof so that the image is superimposed on characters and the like. Specifically, the printer 1 prints the above-mentioned receipts, tickets, and the like. Further, the image to be printed on those printed matters includes a logo mark, a pattern for preventing counterfeiting and is designed appropriately. Further, the image to be printed may be a barcode, a two-dimensional code, or the like.

Figure 3:
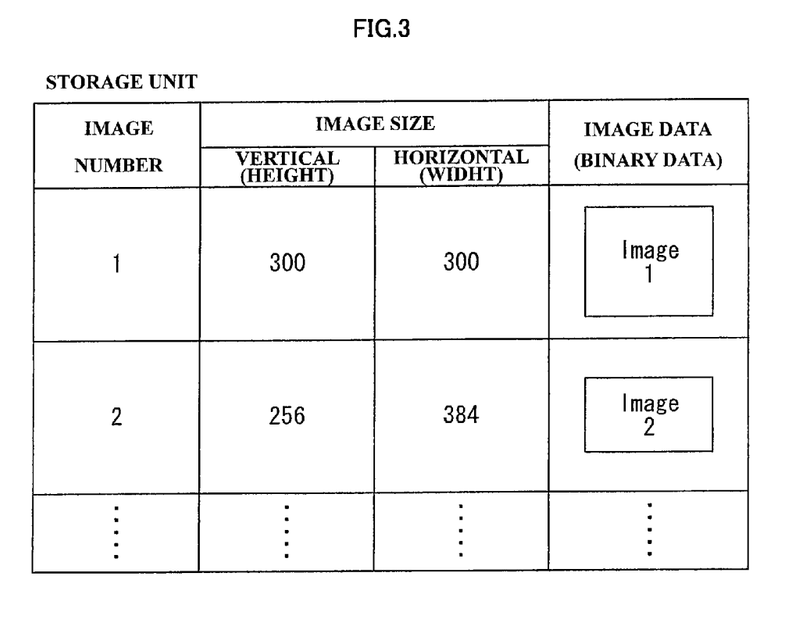
FIG. 3 is a schematic diagram illustrating a configuration of data stored by a storage unit according to the embodiment of the present invention.

FIG. 3 is a schematic diagram illustrating a configuration of data to be stored by the storage unit 30 in the printer 1. As illustrated in FIG. 3, the storage unit 30 stores data in a table form, and has respective items such as an image number, an image size (vertical and horizontal), and image data. Herein, the image number is a main key of the data and used for identifying a plurality of pieces of image data to be stored by the storage unit 30. The image size indicates a vertical (height direction) size and a horizontal (width direction) size represented by the image data in the unit of a dot number. Further, the image data is binary data indicating a bitmap image. The data in the image data has, for example, formats such as Joint Photographic Experts Group (JPEG), Graphics Interchange Format (GIF), and Portable Network Graphics (PNG). In the illustrated example, image data with a vertical image size of "300" dots and a horizontal image size of "300" dots, represented as "Image 1", is stored corresponding to an image number "1".

Figure 4:
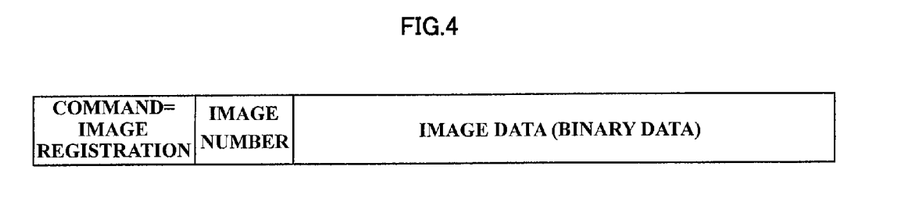
FIG. 4 is a schematic diagram illustrating a data configuration of a command (message) for registering an image according to the embodiment of the present invention.

FIG. 4 is a schematic diagram illustrating a data configuration of a command (message) for image registration, to be transmitted from the host computer 2 to the printer 1. As illustrated in FIG. 4, the message contains respective items of a command, an image number, and image data (binary data). The command shows that the message gives an instruction of "image registration". The image number is a number for identifying the image. This identification is shared by the printer 1 and the host computer 2. The image data is binary data indicating a bitmap image, and the content thereof is as described above with reference to FIG. 3.

Figure 5:
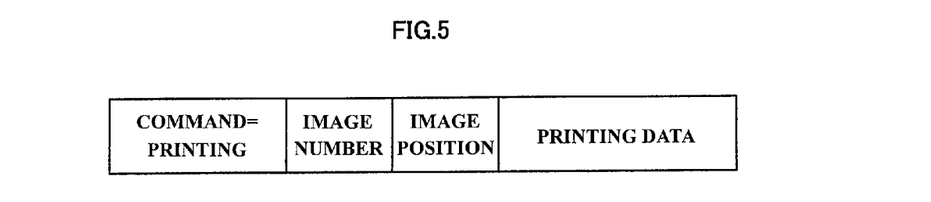
FIG. 5 is a schematic diagram illustrating a data configuration of a command (message) for printing according to the embodiment of the present invention.

FIG. 5 is a schematic diagram illustrating a data configuration of a command (message) for printing, to be transmitted from the host computer 2 to the printer 1. As illustrated in FIG. 5, the message contains respective items of a command, an image number, an image position (image position information), and print data. The command shows that the message gives an instruction of "printing". The image number is data for designating the number of an image to be used for printing. The image position is data for designating which position of a printed matter to be printed an image specified by the image number should be placed at. The image position takes any number of integers of 1 to 9. The print data is data on a text to be used for printing. The print data mainly contains a character string to be expressed by a predetermined character code, and may partly contain a control code. Further, the print data may contain information on a printing size. Here, the printing size refers to the number of dots in vertical and horizontal directions, for example, when printing is performed on paper.

Figure 6:
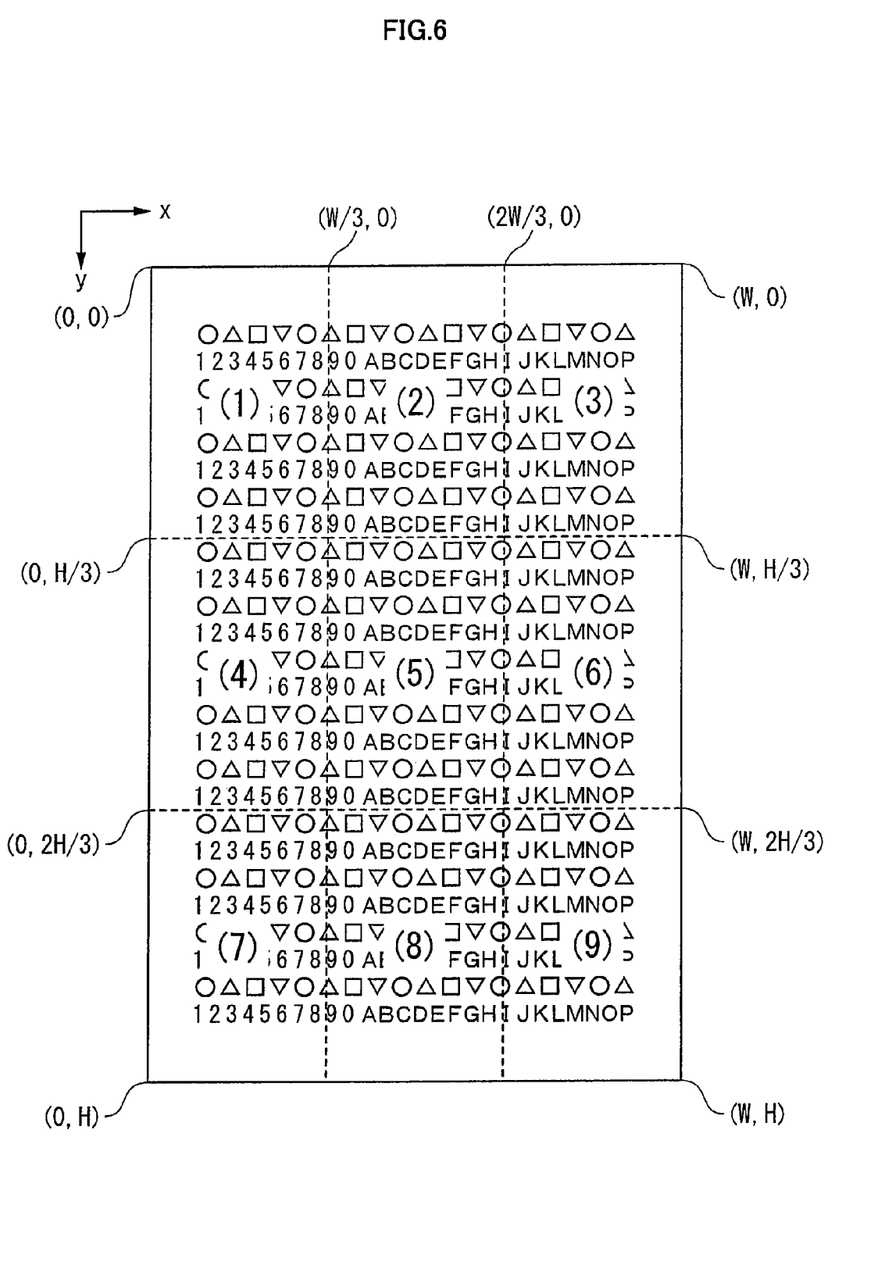
FIG. 6 is a schematic view illustrating a region of a printed matter to be printed by the printer according to the embodiment of the present invention.

FIG. 6 is a schematic view illustrating the above-mentioned image position in a printed matter to be printed by the printer 1. The illustrated printed matter is an example of a receipt. FIG. 6 illustrates a printed receipt in plan view, in which the horizontal direction represents an x-axis direction (the direction from the left side to the right side in the figure represents a positive direction of an x-axis) and the vertical direction represents a y-axis direction (the direction from the upper side to the lower side in the figure represents a positive direction of a y-axis). Illustrated character strings such as "○△□△○△□△ . . . " and "12345678 . . . " represent characters printed by the printer 1. Actually, a part of a region of those character strings may be a blank (space). Two vertical broken lines and two horizontal broken lines are not actually printed on the receipt but drawn for the sake of convenience for illustrating the image position. The surface of the receipt is divided into nine regions by those broken lines.

The numbers from (1) to (9) illustrated respectively in the nine regions are not actually printed on the receipt but illustrated for the sake of convenience for identifying those regions. The illustrated numbers correspond to the above-mentioned image positions. The numbers (image positions) allocated to the respective regions are (1), (2), and (3) from left to right in an upper part. The numbers allocated to the respective regions are (4), (5), and (6) from left to right in a middle part. Then, the numbers allocated to the respective regions are (7), (8), and (9) from left to right in a lower part. The size of the entire receipt is H dots in the vertical direction and W dots in the horizontal direction. Here, H and W are each a multiple of 3. That is, the receipt surface is divided into the above-mentioned nine regions by respective straight lines: x=W/3 and x=2W/3 and y=H/3 and y=2H/3. In other words, for example, coordinates of the upper left corner of the region (1) are (x,y)=(0,0), and coordinates of the lower right corner are (x,y)=(W/3,H/3). Further, coordinates of the upper left corner of the region (8) are (W/3,2H/3), and coordinates of the lower right corner are (x,y)=(2W/3,H). The same applies to the other regions.

In the illustrated example, H>W is satisfied, but H<W or H=W may be satisfied.

Figure 7:
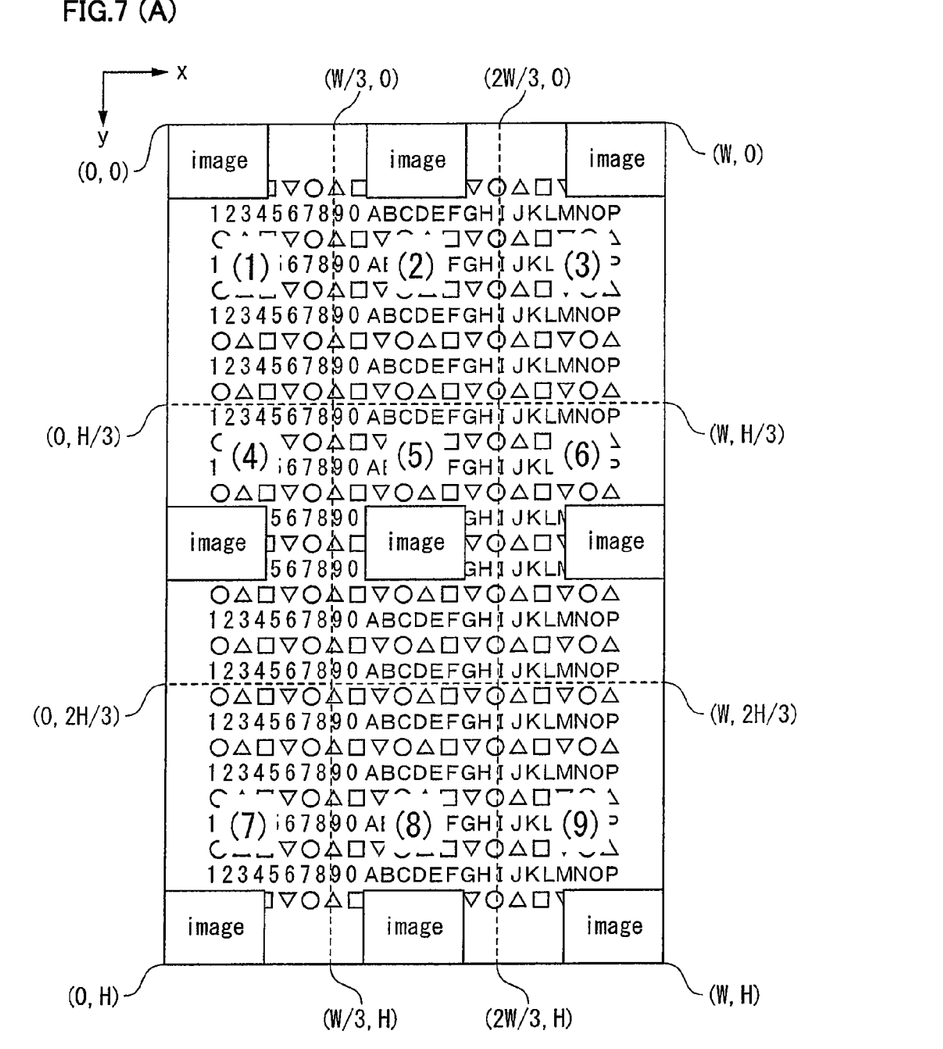
FIGS. 7A and 7B are schematic views illustrating image printing positions in the printed matter to be printed by the printer according to the embodiment of the present invention.

FIG. 7A is a schematic view illustrating relationships between the numerical values of the image positions in the printing command message described above and the actual printing positions of designated images on the receipt. Further, FIG. 7B is a schematic view illustrating the size of an image to be printed on the receipt. As illustrated in FIG. 7B, the size of the image to be printed here is s dots in the horizontal direction and t dots in the vertical direction. In accordance with the value of a designated image position, the printer 1 adjusts the image position as described below.

When the image position "1" is designated, an image is printed so that the upper left corner of the region (1) is matched with the upper left corner of the image.

When the image position "2" is designated, an image is printed so that the center position of the upper side of the region (2) is matched with the center position of the upper side of the image.

When the image position "3" is designated, an image is printed so that the upper right corner of the region (3) is matched with the upper right corner of the image.

When the image position "4" is designated, an image is printed so that the center position of the left side of the region (4) is matched with the center position of the left side of the image.

When the image position "5" is designated, an image is printed so that the center position in vertical and horizontal directions of the region (5) is matched with the center position in vertical and horizontal directions of the image.

When the image position "6" is designated, an image is printed so that the center position of the right side of the region (6) is matched with the center position of the right side of the image.

When the image position "7" is designated, an image is printed so that the lower left corner of the region (7) is matched with the lower left corner of the image.

When the image position "8" is designated, an image is printed so that the center position of the lower side of the region (8) is matched with the center position of the lower side of the image.

When the image position "9" is designated, an image is printed so that the lower right corner of the region (9) is matched with the lower right corner of the image.

A point to be a reference for aligning the position of a region with the position of an image is referred to as an anchor point. For example, when the image position is "1", the upper left corner of the region (1) and the upper left corner of the image are anchor points. When the image position is "2", the center position of the upper side of the region (2) and the center position of the upper side of the image are anchor points. The same applies to the case of the image positions "3" to "9".

Next, the operation procedure of the printer 1 is described. The main processes of the printer 1 are the process of registering an image transmitted from the host computer 2 and the process of printing based on the designation of an image number and the like from the host computer 2.

Figure 8:
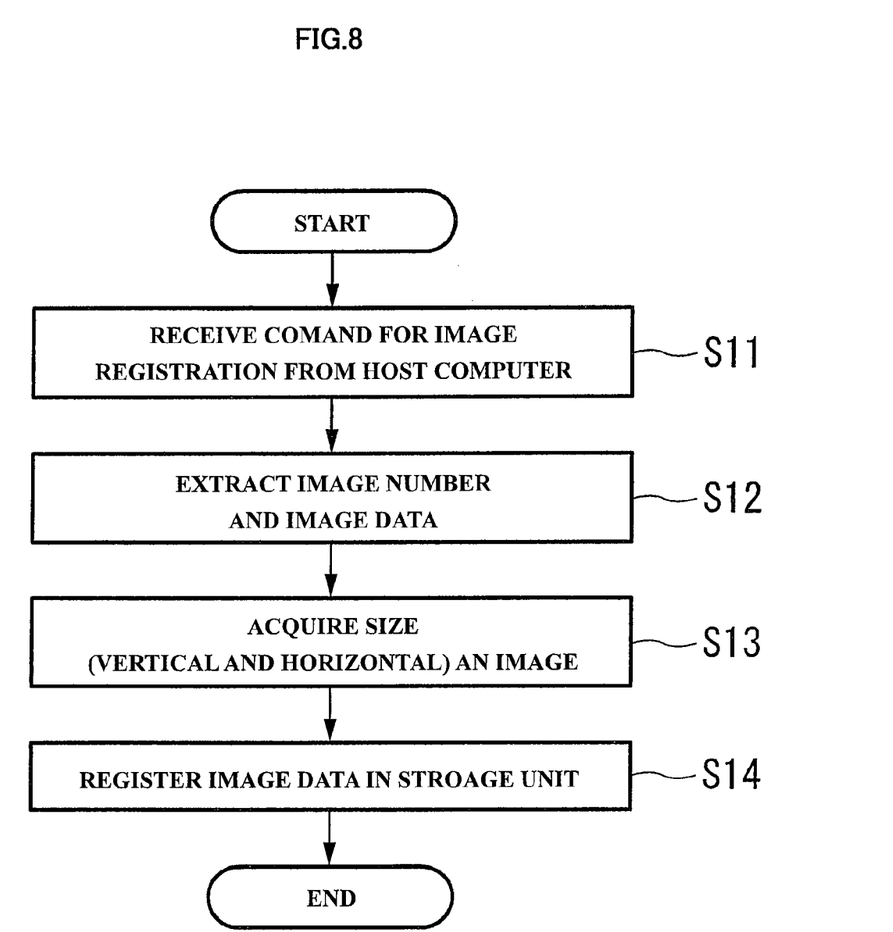
FIG. 8 is a flowchart illustrating a procedure of a process in which the printer according to the embodiment of the present invention receives and registers image data.

FIG. 8 is a flowchart illustrating a procedure of the process in which the printer 1 receives and registers image data. Hereinafter, the procedure is described with reference to the flowchart.

First, in Step S11, the transmitting/receiving unit 10 receives a command for image registration from outside (host computer 2). The data configuration of the command for image registration is as described above with reference to FIG. 4. The transmitting/receiving unit 10 passes data on the command for image registration to the image registering unit 20.

Next, in Step S12, the image registering unit 20 acquires an image number and image data from the data on the command for image registration.

Then, in Step S13, the image registering unit 20 acquires the size (respective numbers of dots in vertical and horizontal directions) of an image from the acquired image data.

Then, in Step S14, the image registering unit 20 writes the acquired image number and image size (in vertical and horizontal directions) and the image data (binary data) in the storage unit 30 in association with one another.

Figure 9:
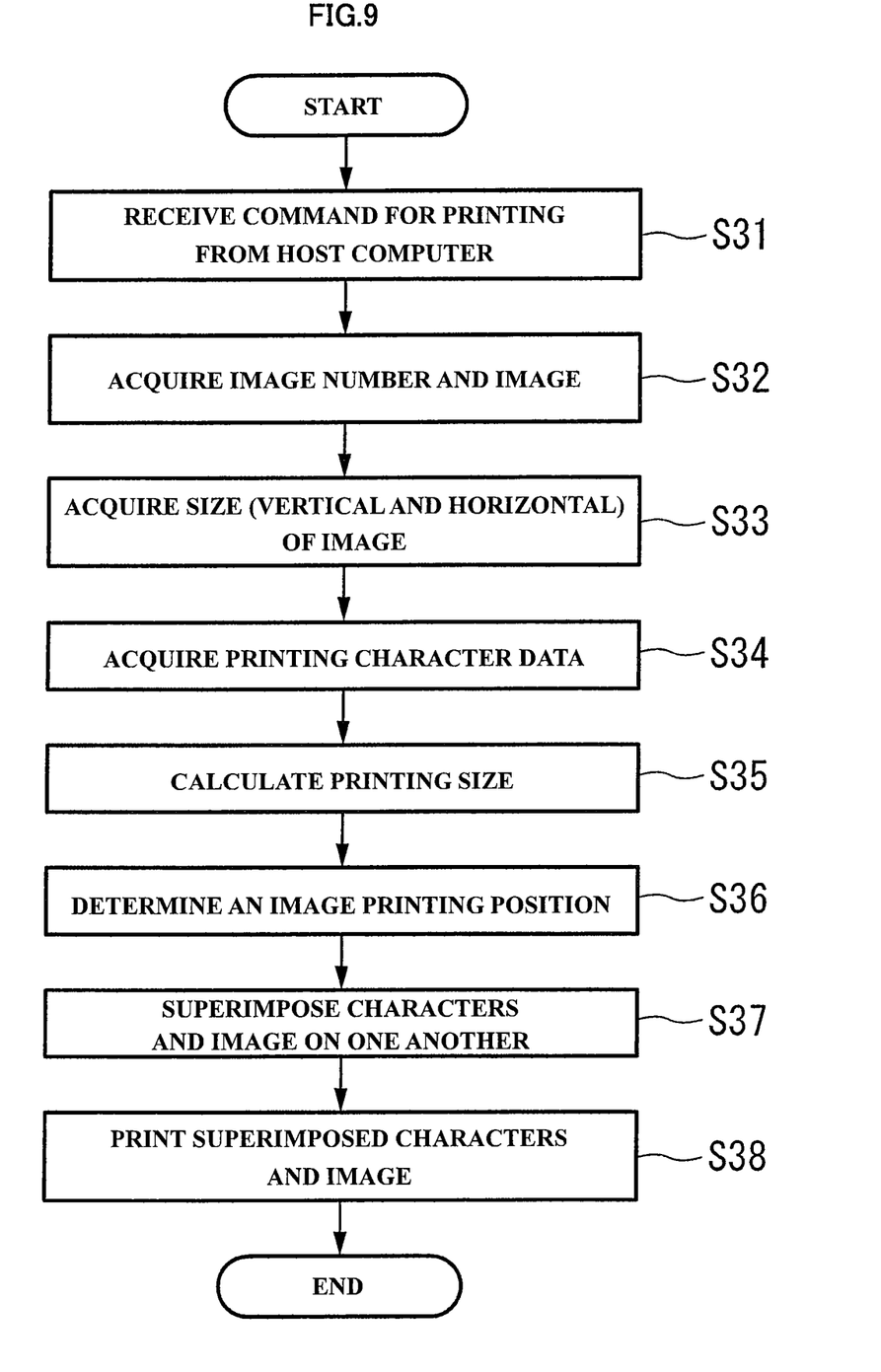
FIG. 9 is a flowchart illustrating a procedure of a process in which the printer according to the embodiment of the present invention prints a designated image so as to superimpose the image on characters.

FIG. 9 is a flowchart illustrating a procedure of the process in which the printer 1 prints a designated image so as to superimpose the image on characters. Hereinafter, the procedure is described with reference to the flowchart.

First, in Step S31, the transmitting/receiving unit 10 receives a command for printing from outside (host computer 2). The transmitting/receiving unit 10 passes data on the command for printing to the image printing position determining unit 40.

Next, in Step S32, the image printing position determining unit 40 acquires an image number and an image position from the data on the command for printing.

Next, in Step S33, the image printing position determining unit 40 reads the size (respective numbers of dots in vertical and horizontal directions) of a designated image from the storage unit 30 based on the image number acquired in Step S32. In the example illustrated in FIG. 7B, the vertical size is t dots and the horizontal size is s dots.

Then, in Step S34, the image printing position determining unit 40 acquires print data from the data on the command for printing.

Next, in Step S35, the image printing position determining unit 40 determines a printing size. Herein, the printing size refers to the respective numbers of dots in the vertical and horizontal directions of the entire printing surface. For example, in FIG. 7A, the vertical size is H dots and the horizontal size is W dots. A method of determining a printing size is, for example, as follows. First, in the case where print data contains information on a printing size, the image printing position determining unit 40 extracts the information on the printing size to determine the printing size. Second, in the case where the numbers of characters and rows to be printed are determined depending upon the print data, the image printing position determining unit 40 determines a printing size by a method of expanding the print data on a printing buffer. Further, at this time, in the case where a printing sheet is roll paper wound in the vertical direction, the horizontal size is given as a fixed value, and hence the image printing position determining unit 40 calculates the vertical size based on the print data. Third, in the case where both the vertical and horizontal sizes are previously set as fixed values, those values are used for the printing size. The case where both the vertical and horizontal sizes are fixed values refers to the case where printing is performed on a cut sheet or the case where printing is performed on a ticket sheet whose ticket surface is previously partitioned by a perforation.

Next, in Step S36, the image printing position determining unit 40 determines an image printing position.

Here, a specific method of determining the position is described by way of an example of the case illustrated in FIGS. 7A and 7B.

In the case where the acquired image printing position is "1", the anchor points are the upper left corner of an image and the upper left corner of the printing region (1). Therefore, the printing position of the image is determined so that the upper left corner of the image is matched with the position of $(x,y)=(0,0)$.

In the case where the acquired image printing position is "2", the anchor points are a center point of the upper side of an image and a center point of the upper side of the printing region (2). Therefore, the printing position of the image is determined so that the upper left corner of the image is matched with the position of $(x,y)=(W/2-s/2,0)$.

In the case where the acquired image printing position is "3", the anchor points are the upper right corner of an image and the upper right corner of the printing region (3). Therefore, the printing position of the image is determined so that the upper left corner of the image is matched with the position of $(x,y)=(W-s,0)$.

In the case where the acquired image printing position is "4", the anchor points are a center point of the left side of an image and a center point of the left side of the printing region (4). Therefore, the printing position of the image is determined so that the upper left corner of the image is matched with the position of $(x,y)=(0,H/2-t/2)$.

In the case where the acquired image printing position is "5", the anchor points are a center point in vertical and horizontal directions of an image (the point of s/2 in the x direction and t/2 in the y direction from the upper left corner of the image) and a center point in vertical and horizontal directions of the printing region (5) (the point of $(x,y)=(W/2,H/2)$). Therefore, the printing position of the image is determined so that the upper left corner of the image is matched with the position of $(x,y)=(W/2-s/2,H/2-t/2)$.

In the case where the acquired image printing position is "6", the anchor points are a center point of the right side of an image and a center point of the right side of the printing region (6). Therefore, the printing position of the image is determined so that the upper left corner of the image is matched with the position of $(x,y)=(W-s,H/2-t/2)$.

In the case where the acquired image printing position is "7", the anchor points are the lower left corner of an image and the lower left corner of the printing region (7). Therefore, the printing position of the image is determined so that the upper left corner of the image is matched with the position of $(x,y)=(0,H-t)$.

In the case where the acquired image printing position is "8", the anchor points are a center point of the lower side of an image and a center point of the lower side of the printing region (8). Therefore, the printing position of the image is determined so that the upper left corner of the image is matched with the position of $(x,y)=(W/2-s/2,H-t)$.

In the case where the acquired image printing position is "9", the anchor points are the upper right corner of an image and the upper right corner of the printing region (9). Therefore, the printing position of the image is determined so that the upper left corner of the image is matched with the position of $(x,y)=(W-s,H-t)$.

In the case where, in the calculation of determining the printing position of an image, a fraction of less than one dot is generated and the printing position cannot be controlled in the unit less than one dot, the image printing position determining unit 40 rounds a value of less than one dot appropriately (truncation, rounding-up, or rounding-off).

Returning to the flowchart of FIG. 9, in Step S37, the superimposing unit 50 superimposes characters and an image on one another. Specifically, the superimposing unit 50 expands printing characters on a printing buffer through the use of the print data acquired in Step S34 and font data (not shown) of the characters. Then, the superimposing unit 50 reads the image data from the storage unit 30 based on the image number acquired in Step S32. Then, the superimposing unit 50 superimposes the read image data on the characters on the printing buffer so that the image data is placed at the position determined in Step S36.

Next, in Step S38, the printing control unit 60 supplies print data on the printing buffer to the printing unit 70. Then, the printing unit 70 performs printing with the characters and the image superimposed on one another.

The process of superimposing an image in Step S37 may be performed once over the entire printing surface or may be performed successively every line (one-dot length in the vertical direction) or every plurality of lines in accordance with means for printing and outputting.

Next, modified examples of this embodiment are described.

First Modified Example

In this modified example, in the case where the size of an image registered in the storage unit 30 is too large, the printer 1 prints the image after reducing the image to an appropriate size.

In the case where the size of an image of a designated image number is larger than that of a printing surface, the image printing position determining unit 40 reduces the image so that the image fits within a predetermined size. Further, at this time, the image printing position determining unit 40 calculates an image size (respective numbers of dots in vertical and horizontal directions) after the reduction. Here, the case where the size of an image of a designated image number is larger than that of a printing surface refers to the case where the vertical size of the designated image is larger than that of the printing surface, the case where the horizontal size of the designated image is larger than that of the printing surface, or both of those cases. At this time, the image printing position determining unit 40 determines the reduction ratio of the image so that both the vertical and horizontal sizes fit within the printing surface.

The processes after the process of reducing an image are as described above.

Specifically, in this modified example, in the case where an image size does not fit within a predetermined size, the image printing position determining unit 40 determines a position of a printing surface at which an image is to be printed, after reducing the image size so that the image size fits within a predetermined size.

Thus, the entire image can fit within the printing surface without cutting an image.

Second Modified Example

In the first modified example, in the case where an image is larger than a printing surface, the image is reduced so as to fit within the printing surface. In a second modified example, in the case where the size of an image registered in the storage unit 30 is larger than that of one region (each region from (1) to (9) in FIG. 6) on the printing surface, the printer 1 prints the image after reducing the image to an appropriate size.

In the case where the size of an image of a designated image number is larger than that of one printing region (in the case of the example of FIG. 6, one third of the size of the entire printing surface in vertical and horizontal directions, that is, H(height)/3 dots and W(width)/3 dots), the image printing position determining unit 40 reduces the image so that the image fits within a predetermined size. Further, at this time, the image printing position determining unit 40 calculates an image size (respective numbers of dots in vertical and horizontal directions) after the reduction. Herein, the case where the size of an image of a designated image number is larger than that of one region refers to the case where the vertical size of the designated image is larger than the vertical size of one region, the case where the horizontal size of the designated image is larger than the horizontal size of one region, or both of those cases. At this time, the image printing position determining unit 40 determines the reduction ratio of an image so that both the vertical and horizontal sizes fit within one region.

The processes after the process of reducing an image are as described above.

Specifically, in this modified example, in the case where an image size does not fit within a predetermined size, the image printing position determining unit 40 determines a position on a printing surface at which an image is to be printed, after reducing the image size so that the image size fits within the predetermined size.

Thus, the entire image can fit within one region.

The process function of a printer in the above-mentioned embodiment may be realized by a computer. In this case, a program for realizing the control function may be recorded on a computer-readable recording medium, and the program recorded on the recording medium may be read into a computer system to be executed. The "computer system" as used herein includes hardware such as an operating system (OS) and peripheral devices. The "computer-readable recording medium" refers to storage devices such as portable media (e.g., a flexible disk, a magneto-optical disc, a ROM, and a CD-ROM) and a hard disk contained in a computer system. The "computer-readable recording medium" may also include the one that dynamically holds a program for a short period of time, such as a communication wire in the case of transmitting the program through a network such as the Internet or a communication link such as a telephone line, and the one that holds a program for a predetermined period of time, such as a volatile memory in a computer system to be a server or a client in that case. Further, the program may be the one for realizing a part of the above-mentioned function and may be the one that can realize the above-mentioned function in combination with a program recorded already in a computer system.

Although the embodiment of the present invention is described with reference to the drawings, the specific configuration is not limited to the embodiments and also includes design and the like without deviating from the gist of the present invention. For example, the printer 1 in the above-mentioned embodiments is used for a POS register system. However, the printer 1 is not limited to the POS register system, and the present invention may be applied to printers of an accounting system, a settlement system, a business transaction system, a logistics system, an administration system, an issuing system of tickets and vouchers, an automated teller machine (ATM), and a handy terminal used in restaurants.

Further, in the above-mentioned embodiments, a printing surface is divided into nine regions (3 (vertical direction)×3 (horizontal direction)) and a region is designated with a numerical value of 1 to 9. However, the printing surface may be divided by other methods. Further, the division number is not limited to nine. The printing surface may be divided into any number of regions and the position of the divided region may be designated.

What is claimed is:

1. A printer comprising:
   a storage unit for storing image identification information for identifying an image, image size information, and image data indicating an image content in associated state;
   a receiving unit for receiving the image identification information, image position information, and print data from an external source as printing command data, the print data including text characters and printing size, wherein the image comprises a characteristics mark feature that is associated with informational content of the print data;
   an image printing position determining unit for reading the image size information from the storage unit based on the image identification information in the printing command data, partitioning a printing surface into a plurality of regions and assigning numerical values to each of the plurality of regions on the printing surface, each numerical value corresponding to a particular location at perimeter of each region, and determining an image position in each region on the printing surface at which the image is to be printed, based on associating the numerical values with the image position information and the image size information;
   a superimposing unit for superimposing the image data on the print data received at the position determined on the printing surface; and
   a printing unit for printing the superimposed image data and the print data.

2. A printer according to claim 1, wherein:
   the receiving unit receives the image identification information and the image data indicating the image content from the external source as image registration command data; and
   the printer further comprises an image registering unit for writing the image identification information and the image data in the image registration command data in the storage unit in the associated state.

3. A printer according to claim 2, wherein, in a case where an image size does not fit within a predetermined size, the image printing position determining unit determines the position on the printing surface at which the image is to be printed after reducing the image size so that the image size fits within the predetermined size.

4. A printer according to claim 1, wherein, in a case where an image size does not fit within a predetermined size, the image printing position determining unit determines the position on the printing surface at which the image is to be printed after reducing the image size so that the image size fits within the predetermined size.

5. A printer according to claim 1, wherein the image comprises one or more of a logo mark, an anti-counterfeiting pattern feature, a barcode, or a two-dimensional code.

6. A printing method for use in a printer including a storage unit for storing image identification information for identifying an image, image size information, and image data indicating an image content in associated state,
   the method comprising:
   receiving the image identification information, image position information, and print data from an external source as printing command data, the print data including text characters and printing size, wherein the image comprises a mark feature that is associated with informational content of the print data;
   partitioning a printing surface into a plurality of regions;
   reading the image size information from the storage unit based on the image identification information in the printing command data and assigning numerical values to each of the plurality of regions in the printing surface, each numerical value corresponding to a particular location at perimeter of each region, and determining a position in each region on the printing surface at which the image is to be printed, based on associating the numerical values with the image position information and the image size information;
   superimposing the image data read from the storage unit on the print data at the determined position; and
   printing the superimposed image data and the print data.

7. A printing method according to claim 6, wherein the image comprises one or more of a logo mark, an anti-counterfeiting pattern feature, a barcode, or a two-dimensional code.

8. A program stored on a non-transitory computer readable media for execution by a computer to initiate and implement control functions of a printer, the printer comprising:
   a storage unit for storing image identification information for identifying an image, image size information, and image data indicating an image content in association with one another;
   a receiving unit for receiving the image identification information, image position information, and print data from an external source as printing command data, the print data including text characters and printing size, wherein the image comprises a characteristics mark feature that is associated with informational content of the print data;
   an image printing position determining unit for reading the image size information from the storage unit based on the image identification information in the printing command data, partitioning a printing surface into a plurality of regions and assigning numerical values to each of the plurality of regions on the printing surface, each numerical value corresponding to a particular location at the perimeter of each region, and determining a position in each region on the printing surface at which the image is to be printed, based on associating the numerical values with the image position information and the image size information;
   a superimposing unit for superimposing the image data on the print data at the position determined on the printing surface; and
   a printing unit for printing the superimposed image data and the print data.

9. A program according to claim 8, wherein the image comprises one or more of a logo mark, an anti-counterfeiting pattern feature, a barcode, or a two-dimensional code.

* * * * *